United States Patent
Pole, II et al.

(10) Patent No.: US 6,675,304 B1
(45) Date of Patent: Jan. 6, 2004

(54) SYSTEM FOR TRANSITIONING A PROCESSOR FROM A HIGHER TO A LOWER ACTIVITY STATE BY SWITCHING IN AND OUT OF AN IMPEDANCE ON THE VOLTAGE REGULATOR

(75) Inventors: Edwin J. Pole, II, Hillsboro, OR (US); Scott R. Rushford, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/450,321

(22) Filed: Nov. 29, 1999

(51) Int. Cl.[7] .............................. G06F 1/26; G06F 1/32
(52) U.S. Cl. ...................... 713/322; 713/300; 713/320; 713/323; 713/340
(58) Field of Search .................... 713/300, 340, 713/330, 323; 323/220, 234; 361/93.1

(56) References Cited

U.S. PATENT DOCUMENTS

| | | | | |
|---|---|---|---|---|
| 4,686,617 A | * | 8/1987 | Colton | 361/93.9 |
| 4,945,444 A | * | 7/1990 | Schwertlein et al. | 307/127 |
| 5,079,448 A | * | 1/1992 | Matsumoto | 326/124 |
| 5,594,636 A | * | 1/1997 | Schauder | 363/159 |
| 6,006,336 A | * | 12/1999 | Watts et al. | 713/322 |
| 6,232,830 B1 | * | 5/2001 | Fournel | 327/540 |
| 6,266,776 B1 | * | 7/2001 | Sakai | 713/300 |
| 6,278,598 B1 | * | 8/2001 | Suzuki et al. | 307/125 |
| 6,522,981 B2 | * | 2/2003 | Smit et al. | 702/60 |

FOREIGN PATENT DOCUMENTS

JP 04225615 A * 8/1992 ............ H03K/4/50

OTHER PUBLICATIONS

Rius, J.; Figueras, J.; "Detecting IDDQ Defective CMOS Circuit by Depowering", VLSI Test Symposium, 1995. Proceedings., 13th IEEE, Apr. 30–May 3, 1995, Page(s): 324–329.*

* cited by examiner

Primary Examiner—Thomas Lee
Assistant Examiner—James K Trujillo
(74) Attorney, Agent, or Firm—Trop, Pruner & Hu, P.C.

(57) ABSTRACT

A voltage regulator may switch in an extra load when the voltage regulator changes from a higher to a lower output level in response to a processor change of state in a processor-based system. The additional load at the lower voltage level in the processor-based system may decrease the latency in the voltage level transistor, improving processor performance.

18 Claims, 5 Drawing Sheets

SYSTEM FOR TRANSITIONING A PROCESSOR FROM A HIGHER TO A LOWER ACTIVITY STATE BY SWITCHING IN AND OUT OF AN IMPEDANCE ON THE VOLTAGE REGULATOR

BACKGROUND

This invention relates generally to processor-based systems and particularly to the control of voltage regulators in those systems.

Different types of power and thermal management techniques have been implemented in processor-based systems. One technique, defined in the Advanced Configuration and Power Interface (ACPI) Specification, rev. 1.0, published on Dec. 22, 1996, provides an interface between the operating system of a processor-based system and hardware devices to implement power and thermal management.

The ACPI specification describes a number of processor states each with different power consumption. As a processor transitions to ever lower power consumption states, the time for the processor to return to a full performance state may be reduced. In connection with some of these transitions, the output voltage of a voltage regulator for the processor-based system changes from a higher to a lower output level.

In the ACPI specification, a processor may include a plurality of low activity states such as the C1, C2 or C3 states. In the deep sleep state, which may be the C3 state defined under the ACPI specification, the external clock to the processor is disabled so that no activities are performed by the processor except maintenance of the stored data in the processor's internal caches. In the stop grant or C2 state, the processor performs minimal activity, such as snooping for an internal cache line to maintain cache coherency. While the processor is in the lower activity state, the performance mode of the processor may be changed by, for example, changing the core clock frequency and adjusting the core voltage level.

Thus, the processor may operate in multiple states (or speeds) and may transition automatically between these states. In conjunction with these transitions, the operating voltage of the processor is sometimes changed. Normally, the operating, or core voltage supply is heavily filtered with large bulk capacitors as well as high frequency decoupling capacitors.

The transition between states or speeds of the processor-based system is normally performed when the processor is in a lower power consumption state. This means that the current load on the voltage supply is quite low. When transitioning from a higher to a lower voltage, the bulk capacitors discharge to allow the supply to settle to the required voltage. Since the load is low, this transition can take a relatively long time, increasing the transition latency.

Thus there is a need to improve the latency of voltage regulator output level transitions.

SUMMARY

In accordance with one aspect, a method includes transitioning a processor from a higher to a lower activity state. The load on the voltage regulator is increased at a time when the processor is in the lower activity state.

Other aspects are set forth in the accompanying detailed description and claims.
dr

DETAILED DESCRIPTION

In accordance with one embodiment of the present invention, control logic which controls a processor transition, detects a state change that calls for a reduction in the voltage regulator output voltage. The control logic asserts a signal to the voltage regulator indicating the desired new output level and monitors a signal from the voltage regulator indicating whether the output is within range. At the same time a separate signal to the voltage regulator is asserted, indicating that the change is a reduction in voltage and providing an additional load on the voltage regulator. When the voltage regulator settles, the control logic negates the separate signal, removing the extra load which is applied to the voltage regulator output.

Figure 1:
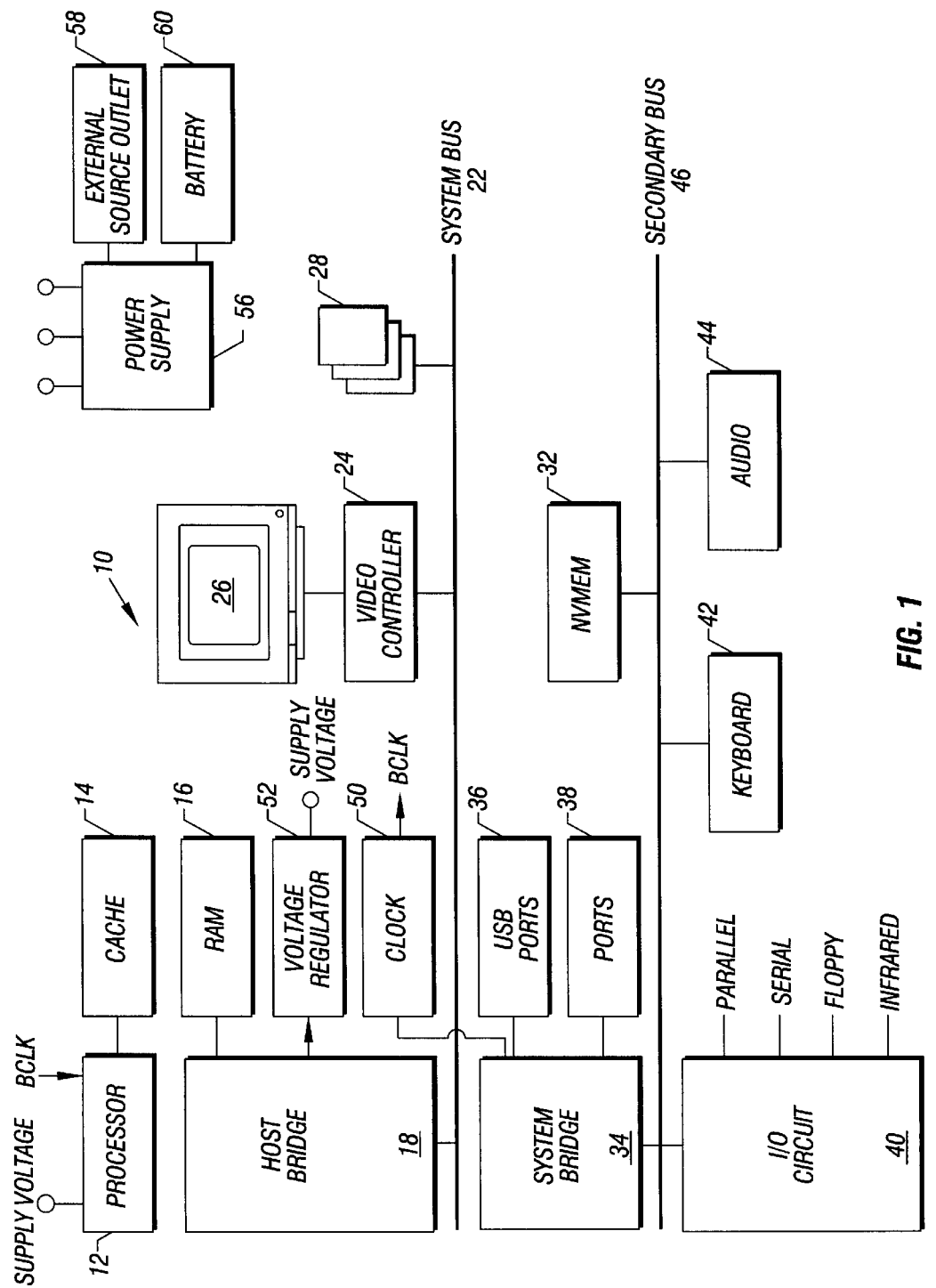
FIG. 1 is a block diagram of a processor-based system in accordance with one embodiment of the present invention.

As shown in FIG. 1, a processor-based system 10, according to one embodiment of the present invention, includes one or more processors 12. The system 10 may be a general or special purpose computer, a microprocessor or microcontroller based system, a handheld computing device, a set-top box, an appliance, a game system or any controller-based device in which the controller may be programmable.

The system 10 includes a clock generator 50 that generates a host clock signal (BCLK) to the processor 12 and a voltage regulator 52 that regulates the supply voltage of the processor 12. A cache memory 14 is coupled to the processor 12 and the system memory 16 may be controlled by a memory controller in a host bridge 18. A system bus 22 may be coupled to other components, including a video controller 24 coupled to a display 26 and peripheral devices coupled to slots 28. A secondary or expansion bus 46 is coupled by a system bridge 34 to the system bus 22. The system bridge 34 may include interface circuits to different ports, including a Universal Serial Bus (USB) port 36 (as described in the Universal Serial Bus Specification, revision 1.0, published in January 1996) and mass storage ports 38 that may be coupled to mass storage devices such as a hard disk, a compact disk or a digital video disk drive, as examples.

Other components may be coupled to the secondary bus 46 including an input/output circuit 40 connectable to a parallel port, serial port, floppy drive or infrared port. A nonvolatile memory 32 for storing basic input/output system (BIOS) routines may be located on the bus 46, as may a keyboard device 42 and an audio control device 44. The main power supply voltages in the system 10 are provided by a power supply circuit. 56 that is coupled to a battery 60 and an external power supply outlet 58 in accordance with an embodiment which is a laptop or portable computer.

Various software firmware layers (formed of modules or routines, for example), including applications, operating system modules, device drivers, BIOS modules, interrupt handlers, may be stored at one or more storage media in the system. The storage media include the hard disk, compact disk, digital video disk drives, the floppy drive, the non-volatile memory, and system memory. The modules, routines, or other layers stored in the storage media contain instructions that when executed cause the system 10 to perform programmed acts.

The software and firmware layers can be loaded into the system 10 in one of many different ways. For example code segments stored on floppy disk, compact disk or digital video disk media, hard disk, or transported through a network interface card, modem, or other interface mechanisms may be loaded into the system 10 and executed as corresponding software or firmware layers. In the loading or transport process, data signals that are embodied as carrier waves may communicate the code segments to the system 10.

Figure 2:
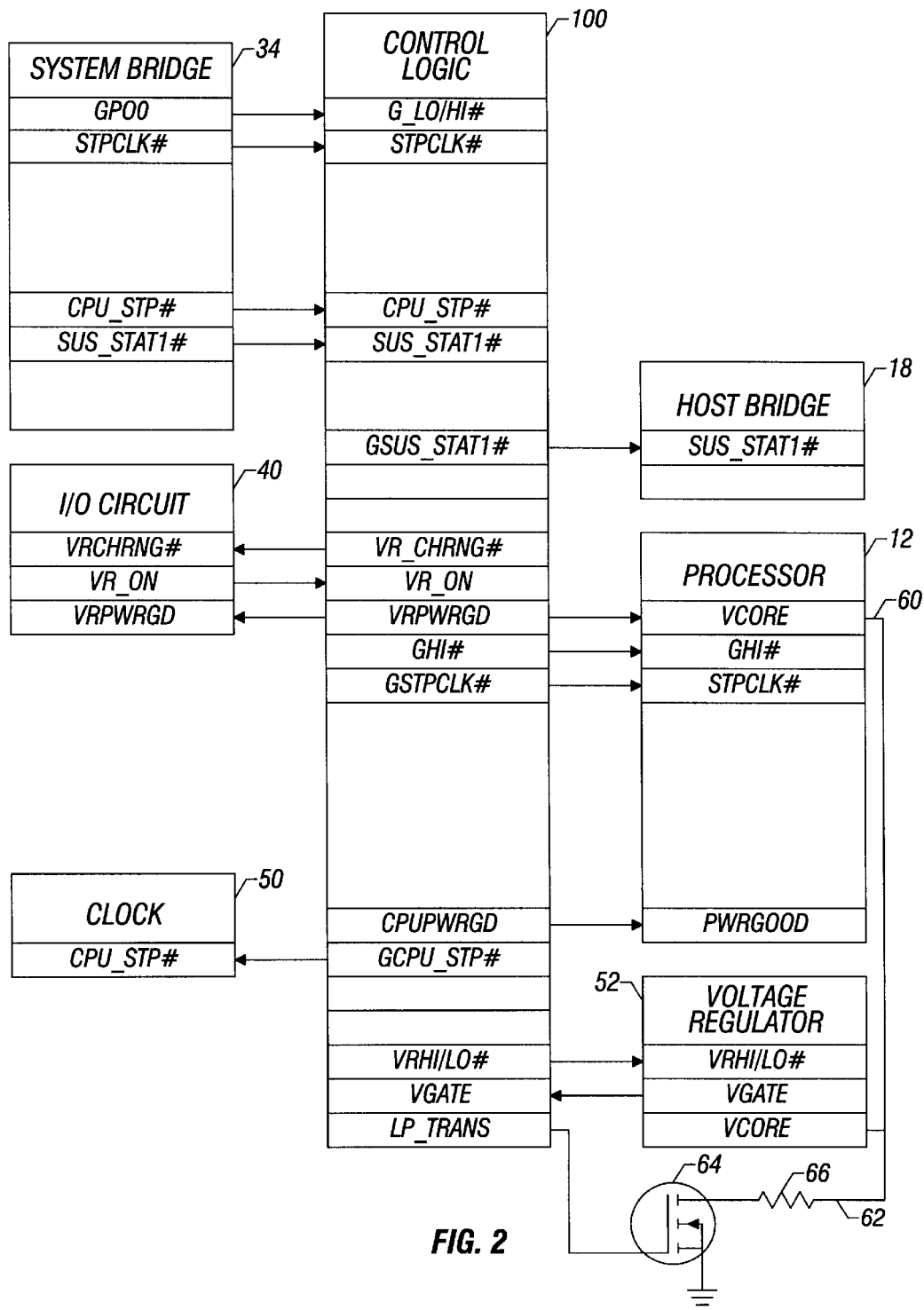
FIG. 2 is a block diagram of power management control logic in the system of FIG. 1 in accordance with one embodiment of the present invention.

Referring to FIG. 2, the control logic 100 may be utilized in accordance with one embodiment of the present invention to control the operation of the voltage regulator 52. In the illustrated embodiment, the control logic 100 may be included as part of the host bridge 18 and/or system bridge 34. Alternatively, the control logic 100 may be implemented as one or more separate integrated circuits.

In addition, instead of being configured with host and system bridges 18 and 34 as illustrated in FIG. 1, the circuitry may be implemented as a memory hub (including interfaces to the processor or system memory) and as a input/output (I/O) hub (including interfaces to the system bus and secondary bus). In this configuration, the control logic 100 may be implemented in the memory hub. With the memory and I/O hubs, messages rather than signals may be used to provide the functions of the control logic 100.

The control logic 100 provides control signals to the voltage regulator 52 to adjust its output voltage level and to the processor 12 to adjust the processor's internal clock frequency. In addition, the control logic 100 may be responsible for placing the processor into a lower activity state to transition the system to different performance and power consumption states. Further, the control logic 100 may drive a clock control input (e.g., GSTPCLK#) of the processor 12 to perform clock throttling as desired. Alternatively, an internal controller register in the processor 12 may be used to program the processor's performance state.

A signal VRHI/LO# is provided by the control logic 100 to the voltage regulator 52 to adjust the voltage levels supplied by the voltage regulator 52 on the line 60 up or down. A signal GCPU_STP# is provided to the clock generator 50 to place the processor 12 in a low activity state (e.g., deep sleep or stop grant state) so that the clock 50 frequency and supply voltage level of the processor 12 may be varied. The low activity state may also be defined as any of the C1, C2 and C3 states under the Advanced Configuration and Power Interface (ACPI) Specification, revision 1.0, published on Dec. 22, 1996. Further, the signal GSTPCLK# may be used to perform processor clock throttling. Additional signals may be used to adjust the core clock frequency to more than two levels.

Similarly, additional signals may be used to control the voltage levels provided by the voltage regulator 52. In the illustrated embodiment, a signal G_LO/HI# from the system bridge 34 indicates the desired system state and controls the states of VRHI/LO# in the voltage regulator 60.

A signal VR_CHGNG# is provided by the control logic 100 to the I/O circuit 40 to indicate that the voltage level from the voltage regulator 52 is changing. A signal VRPWRGD from the control logic 100 to the I/O circuit 53 indicates when the output from the voltage regulator 52 is within specification.

In accordance with one embodiment of the present invention, when the voltage regulator on signal (VR_ON) is active (which is true whenever the system is on), the voltage regulator 52 settles to an output selected by VRHI/LO# (a low level or high level). By way of example, a low voltage level may be 1.3 volts while a high voltage level may be about 1.8 volts. If the outputs of the voltage regulator are "on" and within specifications, the voltage regulator 52 asserts a signal VGATE, which in turn controls the state of the signal VRPWRGD provided by the control logic 100 to the I/O circuit 40. To prevent a system reset, the signal VRPWRGD is maintained active during the performance state transition by the control logic irrespective of the condition of the VGATE.

Figure 3:
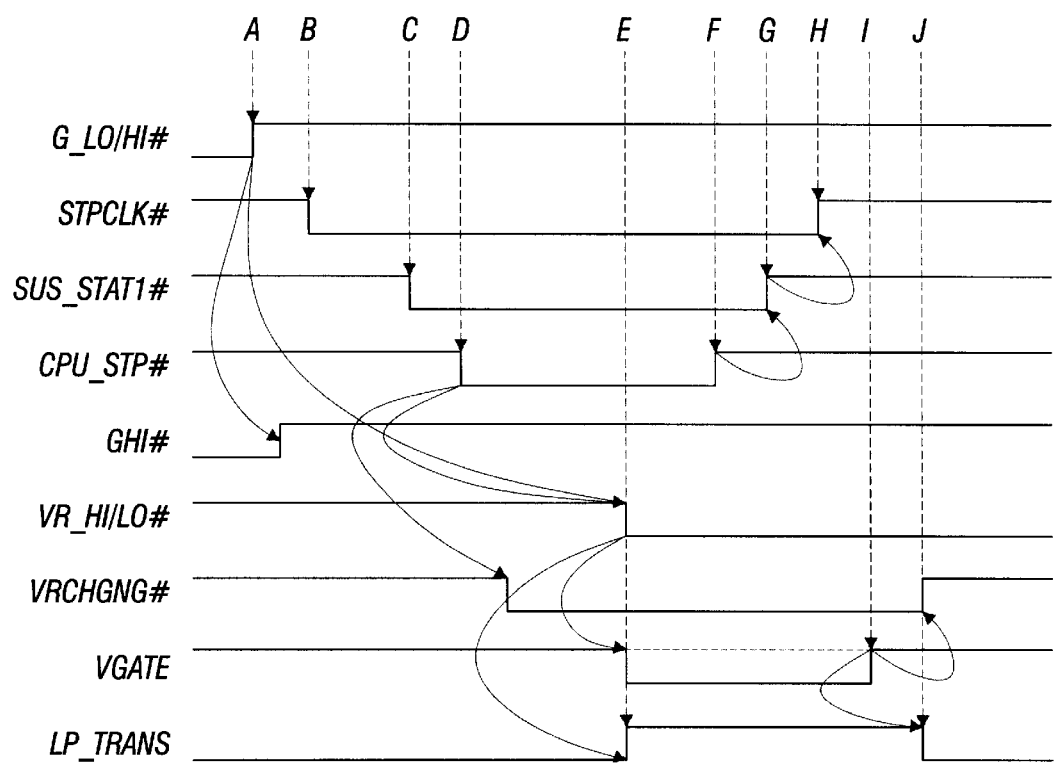
FIGS. 3 and 4 are timing diagrams that show signal events in the performance of a voltage regulator output voltage reduction in the case of FIG. 3 and an output voltage increase in the case in FIG. 4.

Referring to FIG. 3, when the processor 12 transitions during deep sleep (or some other relatively lower power consumption state) from a high to a low performance state, the associated voltage regulator output changes from high to low. The signal G_LO/HI# signal to the control logic 100 indicates, at time "A", that the system desires to transition to a low performance state. The signal is inverted. The GHI# signal to the processor switches indicating to the processor what the new desired state is.

The signal STPCLK# asserts low (as indicated at "B") indicating to the processor that a transition to a quick start state is desired in the case of a mobile Pentium© processor. A signal SUS_STAT1# asserts (as indicated at "C") indicating that the system memory should switch to a suspend clock refresh.

As indicated at D in FIG. 3, the signal CPU_STP# asserts, stopping the processor bus clock and forcing the processor into the deep sleep state. This indicates to the control logic 100 that a transition should be started. The logic takes control and asserts VRCHGNG#.

After a certain period, the control logic 100 changes VRHI/LO#, as indicated at time E. This signal changes the voltage regulator setting from a higher to a lower output level. The voltage regulator may negate the signal VGATE, indicating that the output is settling. The control logic 100 also asserts the signal LP_TRANS at this point. The signal LP_TRANS controls the conduction of a switch 64, such as a field effect transistor, to switch in a load 66 to discharge the bulk capacitors on the output 62 of the voltage regulator. This reduces the settling time of the voltage regulator to the lower voltage level.

At the time indicated as F, the signal CPU_STP# is negated. This signal is normally trapped by the control logic and kept asserted until the end of the voltage transition.

At time G, SUS_STAT1# is negated. This signal is normally trapped by the control logic and kept asserted until the end of the transition.

STPCLK# is negated at time H. This signal is also normally trapped by the control logic and kept asserted until the end of the transition.

At time I, the voltage regulator may assert VGATE when the output is settled properly. Alternatively, the control logic may time out. This starts the exit from the deep sleep state.

At time J, the control logic negates VRCHGNG# indicating that the exit from the deep sleep state is starting. LP_TRANS is negated at the same time which can be used by the voltage regulator to remove the load 66 from the output 62.

Figure 4:
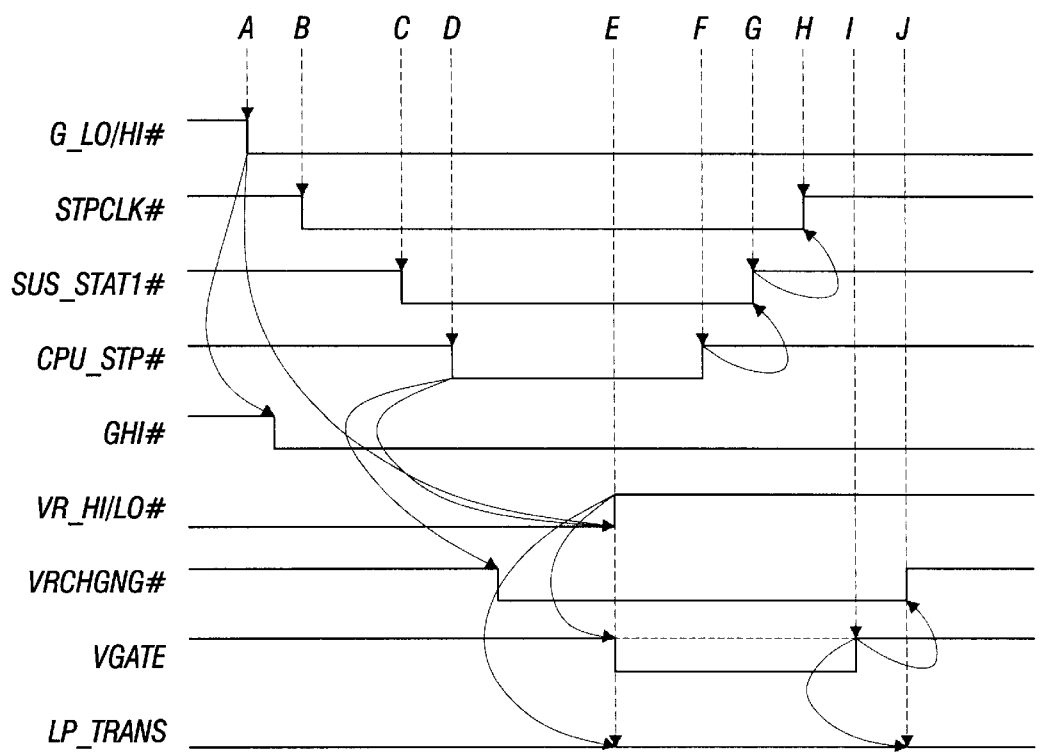

A transition to a higher voltage regulator output level, shown in FIG. 4, proceeds without LP_TRANS asserting at interval E. Similarly, GHI# goes low at time interval A and VRHI/LO# goes high at time interval E. Otherwise, the signals are as described in connection with the transition to a lower voltage output level.

By switching in the load 66 in connection with the transition of the voltage regulator from a higher to a lower output voltage level, the settling time of the voltage regulator may be reduced in some embodiments of the present invention. This decreases the latency caused by the voltage level transition.

Figure 5:
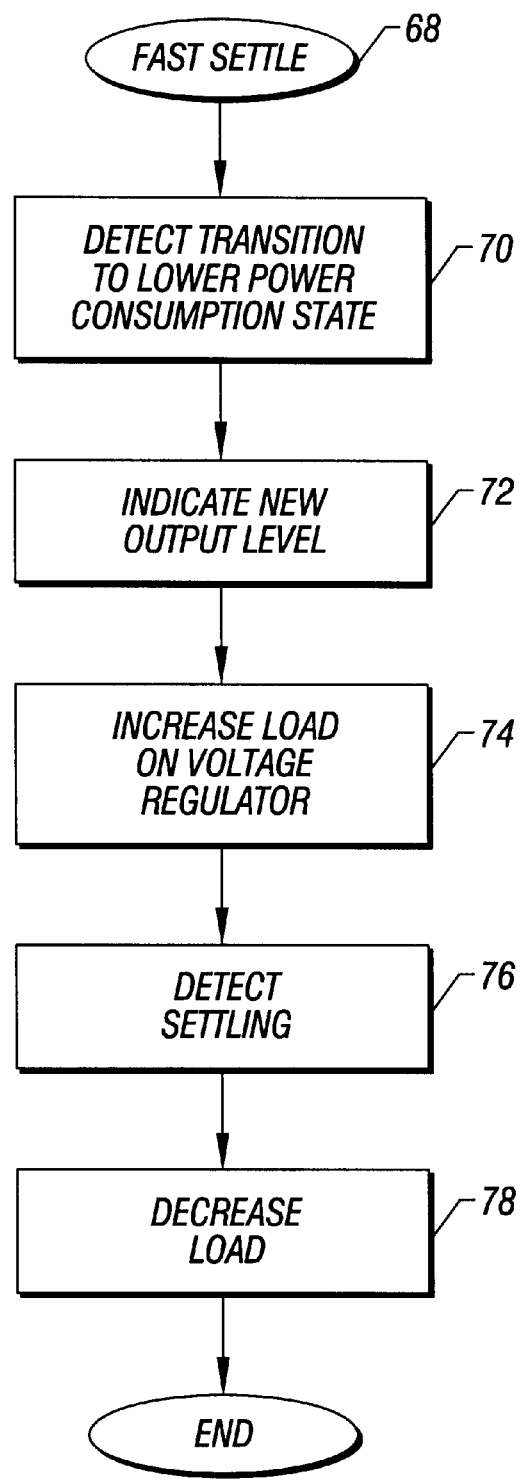
FIG. 5 is a flowchart for software in accordance with one embodiment of the present invention.

Referring now to FIG. 5, initially a transition to a lower power consumption state may be detected as indicated in block 70. This detection may include not only the actual transition, but also the detection of signals which are indicative of the system's impending transition to a lower power consumption state such as a C3 or deep sleep state. The point is that in the lower power consumption state, the load on the voltage regulator may be reduced. This increases the settling time of the voltage regulator to the lower output level.

A new output voltage level for the voltage regulator is indicated as in block 72. In this case, a signal is produced which provides the voltage regulator ultimately with information about what its new voltage output level will be set at.

The load on the voltage regulator is increased as indicated in block 74. In one example, shown in FIG. 2, a load may be selectively switched onto the output of the voltage regulator to increase the rate of settling to the lower output voltage level by discharging the capacitance associated with the voltage regulator.

Next, the settling of the voltage regulator to the lower output voltage level is detected as indicated in block 76. It is not necessary that the voltage regulator completely settle to the lower voltage level, but at some point when the voltage level has substantially transitioned to the lower voltage level, settling may be deemed to have occurred.

In response to the detection of substantial settling to the lower voltage output level, the output load on the voltage regulator may be decreased as indicated in block 78. In the embodiment illustrated in FIG. 2, the switch 64 switches the load 66 off of the output of the voltage regulator 52.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   transitioning a processor from a higher to a lower activity state;
   switching in an impedance on a voltage regulator at a time when the processor is in a lower activity state; and
   switching out said impedance when the voltage regulator output has settled.

2. The method of claim 1 including detecting an indicia that a processor is transitioning to a deep sleep state.

3. The method of claim 1 wherein switching in an impedance includes switching in an impedance that is sufficient to discharge capacitance associated with the output of the voltage regulator to reduce the time for the voltage regulator output to settle to a lower output voltage level.

4. The method of claim 1 including automatically switching out the impedance after a predetermined time.

5. An article comprising a medium for storing instructions that, if executed, enable a processor-based system to:
   transition a processor to a lower activity state;
   switch in an impedance on a voltage regulator at a time when the processor is in the lower activity state; and
   switch out said impedance when the voltage regulator output has settled.

6. The article of claim 5 further storing instructions that enable a processor-based system to reduce the output voltage level of the voltage regulator after switching in the impedance on the voltage regulator.

7. The article of claim 6 further storing instructions that enable a processor-based system to detect an indicia that a processor is transitioning to the deep sleep state.

8. The article of claim 5 further storing instructions that enable a processor-based system to operate a switch to couple an impedance to the output of said voltage regulator.

9. The article of claim 5 further storing instructions that enable a processor-based system to refrain from switching in the impedance when the voltage regulator is transitioning from a lower output voltage level to a higher output voltage level.

10. The article of claim 5 further storing instructions that enable a processor-based system to switch in an extra impedance that is sufficient to discharge the capacitance associated with the voltage regulator and to reduce the time for the voltage regulator output to settle to a lower output voltage level.

11. The article of claim 10 further storing instructions that enable a processor-based system to detect when the output voltage level has substantially settled and, in response, decrease the impedance on the voltage regulator.

12. The article of claim 5 further storing instructions that enable a processor-based system to switch in a resistive impedance onto the voltage regulator output.

13. A processor-based system comprising:
   a processor;
   a voltage regulator coupled to said processor, said regulator including a voltage regulator output;
   control logic coupled to said processor to selectively switch an impedance on the output of said voltage regulator when the processor is in a lower activity state and to switch out said impedance when the voltage regulator output has settled.

14. The system of claim 13 wherein said control logic couples said impedance to the output of said voltage regulator when the processor transitions to a lower activity state and when said voltage regulator transitions to a lower output voltage.

15. The system of claim 13 wherein said impedance is a resistive load.

16. The system of claim 13 including a switch controlled by said control logic to switch said impedance onto the output of said voltage regulator.

17. The system of claim 16 wherein said switch is a field effect transistor.

18. The system of claim 13 wherein said impedance is selectively coupled to said voltage regulator output when the output voltage of said regulator is decreasing and is disconnected from said voltage regulator output when said output voltage is increasing.

* * * * *